Figure 1:
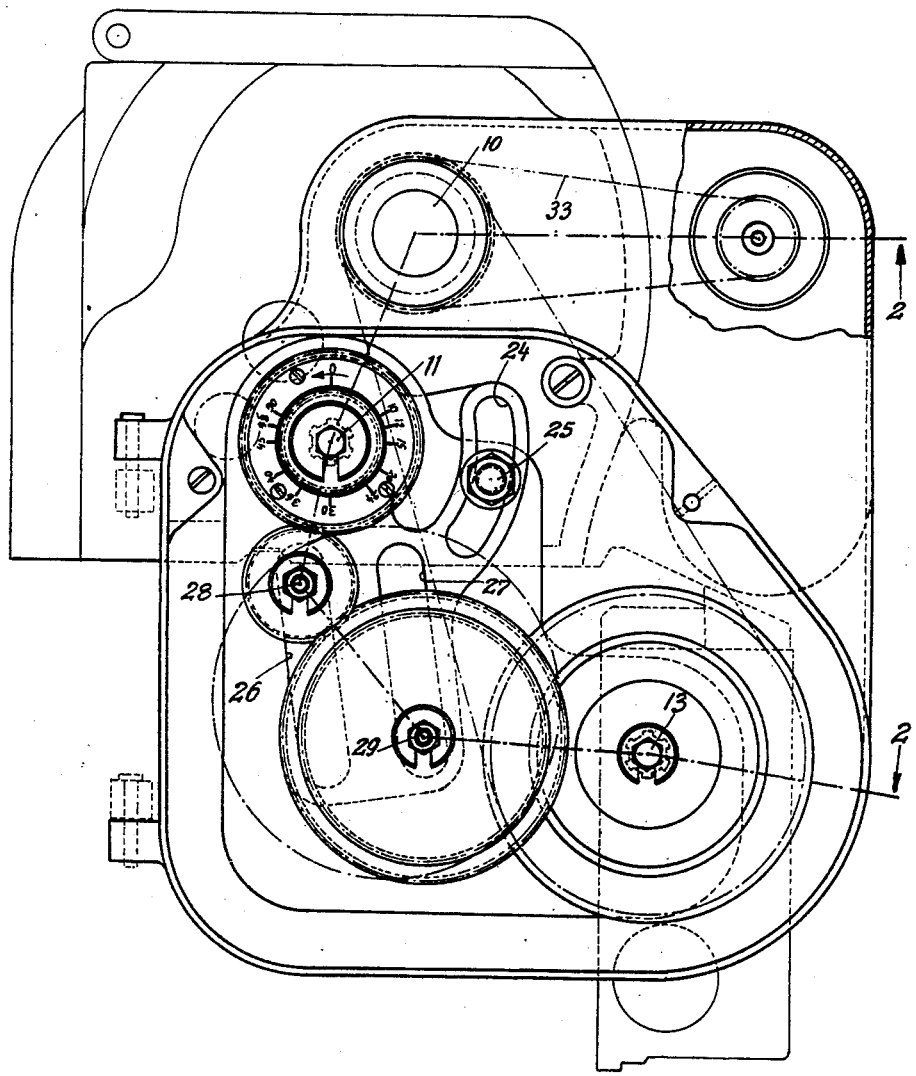

March 22, 1955  F. LAUTENBACH ET AL  2,704,464
FEED TRANSMISSION OF A LATHE

Filed May 2, 1951  2 Sheets-Sheet 1

Inventors
JOSEF IRTENKAUF
KURT FICKENSCHER
REINHOLD HALLER
FRIEDRICH UHINK
FRIEDRICH LAUTENBACH Attorney

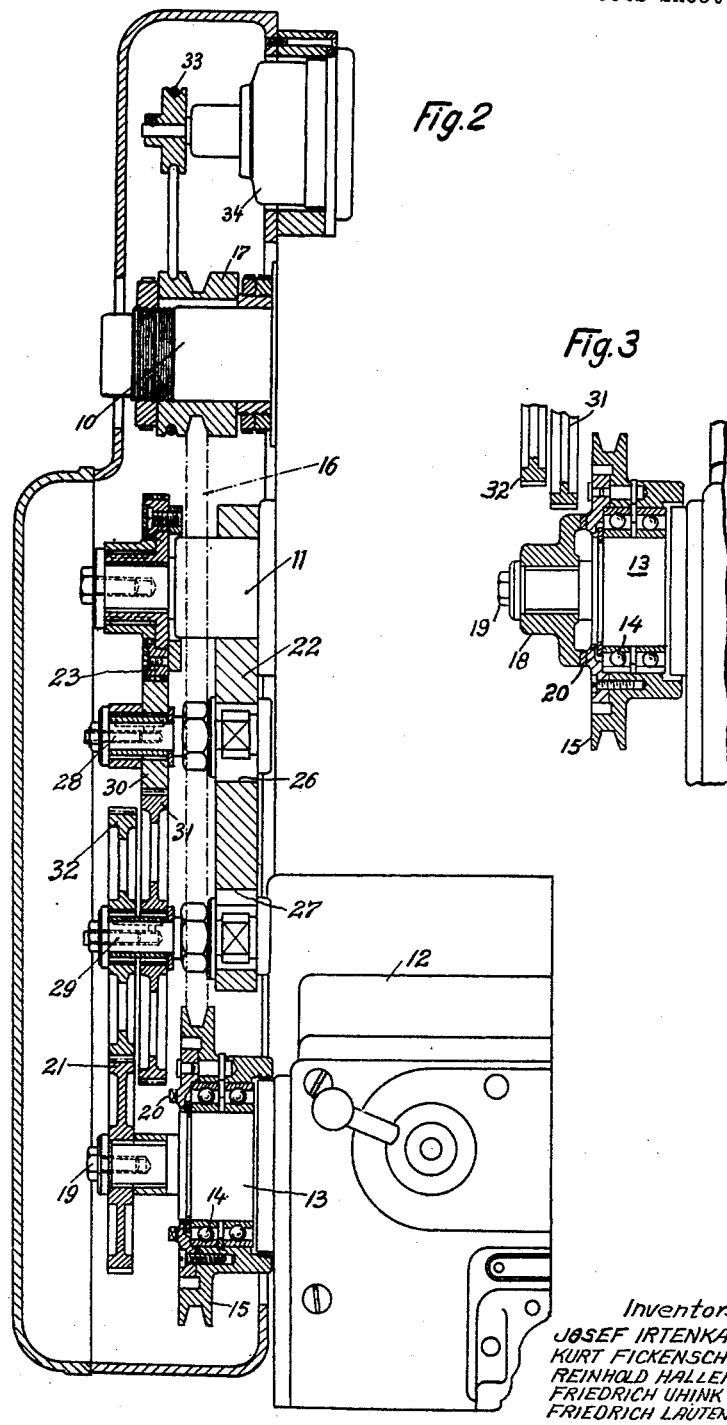

United States Patent Office 2,704,464
Patented Mar. 22, 1955

2,704,464

FEED TRANSMISSION OF A LATHE

Friedrich Lautenbach, Hannover, Friedrich Uhink, Hamburg, and Kurt Fickenscher, Reinhold Haller, and Josef Irtenkauf, Goppingen, Germany Application May 2, 1951, Serial No. 224,102

3 Claims. (Cl. 74—325)

Our invention relates to a feed transmission of a lathe, more particularly of a lathe of the type in which the driving shaft of the feed gear box serving to drive the lead screw and/or the feed shaft of the lathe may be driven optionally by one or the other of two different transmissions depending on whether finishing work or coarse cutting work is to be performed. One of the transmissions includes a belt drive and the other one gears only. Owing to such arrangement finishing work may be performed at a high speed, the risk of producing tatter marks on the work piece being reduced. Such marks originate from rotary oscillations of the work spindle which are liable to be transferred through the feed transmission to the tool. When the feeding elements of the lathe are driven through the belt transmission, however, in performing finishing work, the belt will absorb such oscillations and prevent their transfer to the tool.

In a prior lathe of that kind disclosed in the German Patent No. 730,169 a speed change transmission having two speeds is interposed between the belt transmission operated by the work spindle and the driving shaft of the feed gear box, such speed change transmission offering a possibility to drive the feeding gear at two different ratios of transmission through the belt transmission. Experience has shown, however, that such prior lathe does not render satisfactory services when operated at very high numbers of revolution because too many meshing gears are included in the train of transmission between the work piece and the tool when finishing work is performed via the belt drive.

It is the object of the present invention to provide a lathe adapted to be optionally used for ordinary coarse cutting work or finishing work at very high speeds and which, when used for such finishing work, will produce a work piece free from any markings on the surface thereof. We have found that this object will be achieved by a novel arrangement reducing the numbers of meshing gears interposed between the work spindle and the feed gear box to a minimum when finishing work is to be handled. We have found that in this manner the lathe may be operated at a very high speed without risking any oscillations liable to produce tatter marks on the work piece.

A preferred embodiment of our invention is illustrated in the accompanying drawings in which Fig. 1 is an end view of a lathe showing the headstock and Fig. 2 is the sectional view taken along the broken line 2—2 of Fig. 1, the main headstock casing and the parts included therein being omitted in Fig. 2 for sake of a simplified illustration, the transmission being set for low speed roughing work.

Fig. 3 is a partial sectional view of the transmission shown in Fig. 1 being set for high speed finishing work.

The main work spindle 10 of the lathe which is driven in any suitable manner, for instance from an electric motor through a speed change transmission not shown, is connected with a shaft 11 for common rotation, for instance by one or the other of two different transmissions at the option of the operator, one transmission intended for high speed finishing work comprising a belt drive and the other transmission intended for ordinary low speed work including gears.

At 12 we have illustrated the orthodox feed gear box, the so-called Norton box, in which a driving shaft 13 is mounted that projects therefrom and is adapted to drive the feed elements of the lathe such as the lead screw or the feed shaft not shown. Two separate optionally selectable transmissions are provided for the purpose of driving shaft 13 from the main work spindle 10 or from the shaft 11. One of the two transmissions comprises exclusively a belt drive thus excluding any meshing gears, while the other transmission is primarily composed of change gears.

We shall now describe the two transmissions in detail. Starting with the first transmission intended for high speed finishing work, it will be noted that on the projecting end of shaft 13 there is journalled a pulley 15 by means of a ball bearing 14. A pulley 17 of about half the pitch diameter of pulley 15 is mounted on and keyed to the end of work spindle 10. The belt 16, preferably of the V-type, connects the two pulleys 15 and 17. The pulley 15 is adapted to be directly clutched to shaft 13. For this purpose, shaft 13 is provided with a splined end of reduced diameter on which a clutch member 18 may be fitted and held in position by a nut 19. This clutch member is provided with teeth adapted to engage opposed teeth 20 provided on the end face of pulley 15, as shown in Fig. 3.

However, a change gear 21 may be mounted on shaft 13 in lieu of clutch member 18. Thus, in Fig. 2 such gear 21 is shown which is held in position on the splined end of shaft 13 by nut 19. The gear 21 is adapted to be driven by shaft 11 through exchangeable gears. For this purpose, both a bracket 22 and an exchangeable gear 23 are mounted on the shaft 11, the gear 23 being suitably splined thereto for common rotation therewith. The bracket 22 has an arcuate slot 24 engaging over a bolt 25 fixed in the headstock casing. By means of such bolt 25 the bracket 22 may be firmly clamped in any desired angular position. Moreover, the bracket has two straight slots 26 and 27 adapted to accommodate studs 28 and 29 which may be clamped to the bracket in any desired position within such slots. On the studs 28 and 29 change gears 30, 31 and 32 may be journalled as will appear from Fig. 2. The gear 30 meshes with both the gear 23 fixed to the shaft 11 and with the gear 31 mounted on the stud 29. The gear 32 is suitably attached to the gear 31 for common rotation and engages the gear 21 mounted on the shaft 13. A second belt drive 33 operated by the work spindle 10 may be provided to operate a speedometer 34 capable of indicating a speed from 0 to 1,600 R. P. M.

When the lathe is to be operated at high speeds, the transmission through the belt 16 is selected. For that purpose the change gear 21 is disassembled and replaced by the clutch member 18.

It will be noted that the pulley 15 has about twice the pitch diameter as the pulley 17. For that reason, shaft 13 will be driven at half the speed of the work spindle. Moreover, a considerable force may be transferred to the shaft to effect the feed. For the operation of the lathe at lower speeds such as used for coarse work, the clutch member 18 is replaced by the change gear 21 and such gears 30, 31 and 32 are inserted in the bracket 22 as may be required for the particular job.

While we have described our invention hereinabove with reference to a specific embodiment thereof, we wish it to be clearly understood that the scope of our invention is not restricted to the specific features and details of such embodiment, but that numerous modifications may be made without departing from the scope of our invention. Thus, it is immaterial under certain aspects on which of the two shafts 10 and 11 the pulley 17 is mounted.

What we claim is:

1. In a lathe, the combination comprising a pair of shafts connected for simultaneous rotation, one of said shafts being the work spindle and the other one of said shafts being an auxiliary shaft, a feed transmission including a driving shaft and adapted to drive the feed elements of the lathe, a speed-reducing belt transmission composed of a relatively small pulley fixed to one shaft of said pair, of a relatively large pulley rotatably mounted coaxially to said driving shaft, and of an endless belt surrounding said pulleys, and a set of change gears driven by one shaft of said pair and extending into the vicinity of said driving shaft, the latter being adapted to be optionally either geared to said set of change gears or to be clutched to said relatively large pulley.

2. The combination claimed in claim 1 in which said relatively large pulley has clutch teeth, said driving shaft being splined for the optional accommodation of either a gear adapted to mesh with said set or a toothed clutch member adapted to engage said clutch teeth.

3. In a lathe, the combination comprising a pair of shafts connected for simultaneous rotation, one of said shafts being the work spindle and the other one of said shafts being an auxiliary shaft, a feed transmission including a driving shaft and adapted to drive the feed elements of the lathe, a speed-reducing belt transmission composed of a relatively small pulley fixed to one shaft of said pair, of a relatively large pulley rotatably mounted coaxially to said driving shaft, and of an endless belt surrounding said pulleys, and a set of change gears driven by one shaft of said pair and extending into the vicinity of said driving shaft, a gear meshing with a change gear of said set and being removably mounted on said driving shaft to accommodate the insertion on said driving shaft of a clutch element adapted to clutch said pulley to said driving shaft.

References Cited in the file of this patent

UNITED STATES PATENTS

| 1,211,551 | Curtis | Jan. 9, 1917 |
| 2,464,619 | Siekmann et al. | Mar. 15, 1949 |
| 2,523,397 | Siekmann et al. | Sept. 26, 1950 |